(12) United States Patent
Jacob ELS et al.

(10) Patent No.: US 12,182,764 B2
(45) Date of Patent: Dec. 31, 2024

(54) ISSUE TRACKING SYSTEMS AND METHODS FOR A CONFIGURABLE PROJECT HIERARCHY

(71) Applicants: Atlassian Pty Ltd., Sydney (AU); Atlassian Inc., San Francisco, CA (US)

(72) Inventors: Johannes Jacob ELS, Campbelltown (AU); Anne Jang, Erskineville (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 243 days.

(21) Appl. No.: 17/855,519

(22) Filed: Jun. 30, 2022

(65) Prior Publication Data
US 2024/0005279 A1 Jan. 4, 2024

(51) Int. Cl.
*G06Q 10/10* (2023.01)
(52) U.S. Cl.
CPC .................. *G06Q 10/103* (2013.01)
(58) Field of Classification Search
CPC .................................................. G06Q 10/103
See application file for complete search history.

(56) References Cited

U.S. PATENT DOCUMENTS

2022/0121653 A1* 4/2022 Zhang ................ G06F 16/2379

* cited by examiner

*Primary Examiner* — Etienne P Leroux
(74) *Attorney, Agent, or Firm* — Brownstein Hyatt Farber Schreck, LLP

(57) ABSTRACT

Described herein are systems, methods and computer-readable media for maintaining a configurable project hierarchy. The method includes establishing a project hierarchy with multiple hierarchy levels including first and second hierarchy levels. The first level has an associated issue type. The method further includes receiving a request to change the hierarchy level of the first issue type to the second level. In response to receiving this request, the method includes: accessing from a data store, a hierarchy-issue type association record of the first issue type including an identifier of the first issue type and a current hierarchy level identifier; creating a new hierarchy-issue type association data record including the identifier of the first issue type and a new hierarchy level identifier corresponding to the second hierarchy level; and associating the first issue type with the second hierarchy level by storing the new hierarchy/issue type association data record in the data store.

14 Claims, 9 Drawing Sheets

ISSUE TRACKING SYSTEMS AND METHODS FOR A CONFIGURABLE PROJECT HIERARCHY

TECHNICAL FIELD

The present disclosure is directed to issue tracking systems and methods.

BACKGROUND

Issue tracking systems are systems that manage the creation and tracking of issues in a variety of contexts. Issue tracking systems are variously referred to as a trouble ticket system, support ticket systems, request management systems, and incident ticket systems.

Some issue tracking systems allow for different types of issues to be created and tracked. For example, an issue tracking system may allow users to create their own types of issues (with associated data and workflows) and use those issue types for managing a given project (e.g., a helpdesk, a software development project, an alternative project). While allowing users to create and use different issue types provides flexibility, it can also make managing issues (and types of issues), and the relationships between them, difficult. In particular, if properties of an issue type are changed this may cause the problematic situation where relationships associated with one or more existing issues of this issue type to become invalid due to the property change. This state of invalidity of a relationship includes certain relationship rules being broken because of the property change of an issue type.

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

SUMMARY

Example embodiments described herein are directed to a computer-implemented method for changing a hierarchy level of a first issue type. The method includes establishing a project hierarchy with a plurality of hierarchy levels including a first hierarchy level and a second hierarchy level. The first hierarchy level has an associated issue type. The method further includes receiving, from a user device, a request to change the hierarchy level of the first issue type to the second hierarchy level. In response to receiving the request, the method further includes: accessing from a data store, a hierarchy-issue type association data record of the first issue type including an identifier of the first issue type and a current hierarchy level identifier corresponding to the first hierarchy level; creating a new hierarchy-issue type association data record including the identifier of the first issue type and a new hierarchy level identifier corresponding to the second hierarchy level; and associating the first issue type with the second hierarchy level by storing the new hierarchy/issue type association data record in the data store.

Other example embodiments described herein are directed to a system for changing a hierarchy level of a first issue type. The system includes a processing unit, a communication interface, and a non-transitory computer-readable storage media. The storage media comprising instructions which, when executed by the processing unit, cause the processing unit to establish a project hierarchy with a plurality of hierarchy levels including a first hierarchy level and a second hierarchy level. The first hierarchy level has an associated issue type. The storage media further includes instructions which when executed cause the processing unit to receive, from a user device, a request to change the hierarchy level of the first issue type to the second hierarchy level, and in response to receiving the request to change the hierarchy level of the first issue type to the second hierarchy level, access from a data store, a hierarchy-issue type association data record of the first issue type including an identifier of the first issue type and a current hierarchy level identifier corresponding to the first hierarchy level, create a new hierarchy-issue type association data record including the identifier of the first issue type and a new hierarchy level identifier corresponding to the second hierarchy level, and associate the first issue type with the second hierarchy level by storing the new hierarchy/issue type association data record in the data store.

Some example embodiments are directed to non-transitory computer readable medium that comprises instructions which when executed by a processing unit cause the processing unit to perform the method described above.

Figure 1:
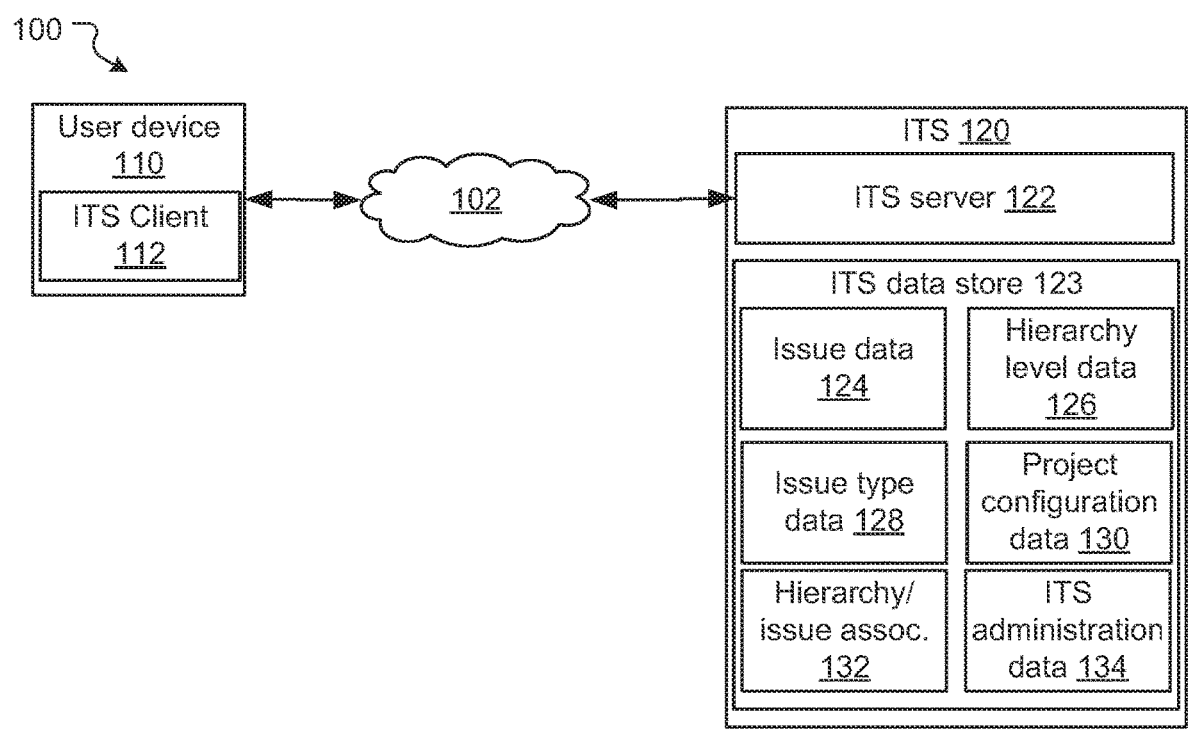
FIG. 1 is a block diagram of a networked environment according to aspects of the present disclosure.

While the embodiments described herein are amenable to various modifications and alternative forms, specific embodiments are shown by way of example in the drawings and are described in detail. It should be understood, however, that the drawings and detailed description are not intended to limit the scope of the embodiments described herein, but to cover all modifications, equivalents, and alternatives falling within the spirit and scope of the embodiments as defined by the appended claims.

DETAILED DESCRIPTION

In the following description, for the purposes of explanation, numerous specific details are set forth in order to provide a thorough understanding of various embodiments described herein. It will be apparent, however, that the embodiments described herein may be practiced without these specific details. In some instances, well-known structures and devices are shown in block diagram form in order to avoid unnecessary obscuring.

In this disclosure, there are two related but different concepts: issue type and hierarchy level.

The term 'issue type' refers to a type or category of an issue. An actual issue created by user will be of a particular issue type. The issue type defines, for example, the data that is (or can be) associated with that issue and the workflow of that issue (for example, the states the issue can be in, and the state transitions the issue can go through).

The term 'hierarchy level' refers to a particular level of a hierarchy. Each level of the hierarchy can be associated with one or more issue types. A hierarchy is an ordering of levels, where, in one example, each level can be associated with an above level (e.g., a parent level) and/or a below level (e.g., a child level). At least one hierarchy level (the topmost level) has no level above it and at least one hierarchy level (the bottommost level) has no level below it. In another example, a hierarchy level can be simply associated with a number, which indicates a ranking of the level within the hierarchy. For example, a base level can be associated with the number '0', a level above the base level with '1', and a level below the base level is '−1'. A level above the '1' level is '2' and so on.

The present disclosure allows for a hierarchy of issue types to be defined, with each level of the hierarchy associated with one or more issue types. In the embodiments described herein, both the hierarchy levels and the association of issue types with those hierarchy levels are configured and specific to a particular project. This means that a hierarchy may be defined specifically for a project and therefore the hierarchy of levels (and/or the issue types associated to those levels) may change from project to project.

In alternative embodiments, hierarchy levels may be commonly defined (either for all projects or on a project-type basis), however the association of issue types with the different hierarchy levels can be user-defined.

In still further alternative embodiments, both hierarchy levels and their associated issue types may be pre-defined (either for all projects or on a project-type basis).

The embodiments described herein relate to the creation and altering of issue type hierarchies in issue tracking systems. For example, user may initially create a particular issue type hierarchy for their project and may at a later stage decide to alter the hierarchy of one or more issue types. This allows users to have the flexibility of structuring their work by introducing and/or changing an arbitrary number of hierarchy levels. By way of example, in a software development context, example of issue types may include stories, bugs and tasks, and examples of hierarchy levels include epic, base and sub-task. If the hierarchy level of a particular issue type is altered, aspects of the present disclosure break existing relationships between issues . . . .

Initially, an example environment in which aspects of the present disclosure can be implemented is described. A description of an example computer system, which is configurable to perform the various operations described herein, is then provided. Following this, issue tracking system operations are described.

FIG. 1 illustrates an example environment 100 in which embodiments and features of the present disclosure can be implemented. Example environment 100 includes a communications network 102, which interconnects user devices (e.g., user device 110) and an issue tracking system (ITS) 120.

User device 110 is a computer processing system with an ITS client application 112 installed thereon. User device 110 may also have other applications installed/running thereon, for example at least an operating system.

When executed by the user device 110 (e.g., by a processing unit such as processing unit 204 described below), the ITS client application 112 configures the user device 110 to provide client-side ITS functionality. This generally involves communicating (using a communication interface such as 218 described below) with the ITS 120 (and, in particular, the ITS server application 122) and performing other operations as described herein. ITS client application 112 may be a dedicated application client that communicates with an ITS application server using an API. Additionally, or alternatively, ITS client application 112 may be a web browser (such as Chrome, Safari, Internet Explorer, Firefox, or an alternative web browser) which communicates with an ITS web server using http/https protocols.

User device 110 may be any form of computing device. Typically, user device 110 may be a personal computing device—e.g., a desktop computer, laptop computer, tablet computer, and in some instance even a mobile phone. While a single user device 110 has been illustrated, an environment would typically include multiple user devices 110 interacting with the ITS 120.

As discussed further below the ITS client application 112 may configure the user device 110 to provide issue type and workflow creation functionality (e.g., creating new issue types and workflows (states that an issue of the issue type may take and the transitions between those states)) and/or workflow use functionality (that is, using existing ITS workflows). Workflows may be created and used by different users (using different user devices), though in many cases the same user may both create and use workflows using the same user device 110.

ITS 120 in this example includes an ITS server application 122, and an ITS issue data store 123.

The ITS server application 122 comprises one or more application programs, libraries, APIs or other software elements which, when executed, configure the ITS 120 to provide server side ITS functionality—e.g., by receiving and responding to requests from ITS client applications (e.g., client application 112), storing/retrieving data from the ITS and data store 123, and performing other operations as described herein.

ITS server application 122 may be a web server (such as Apache, IIS, nginx, GWS, or an alternative web server for interacting with web browser clients) or an application server (e.g., specifically programmed to interact with dedicated application clients using a defined set of application programming interface (API) calls). While ITS 120 has been illustrated with a single server application 122 it may provide multiple servers (e.g., one or more web servers and/or one or more application servers) operating on one or more computing devices/systems.

ITS data store 123 is used to store data involved in the typical operation of the ITS 120. In the present example, the ITS data store stores issue data 124, hierarchy data 126, issue type data 128; project configuration data 130; hierarchy/issue association data 132, and ITS administration data 134.

The issue data 124 may include, for example, data in respect of actual (e.g., instantiated) issues that have been created and are being managed by the ITS, and the ITS administration data 134 may include various data involved in the operation of the ITS (for example, user account details, permissions, and the like). The other types of data will be described further below.

In one embodiment, for each issue, the issue data includes an issue identifier field, an application/service ID field, a timestamp of when the issue was created, a status identifier field, an issue summary field, etc. Further, the issue data for an issue may include parent-child relationship information, e.g., in the form of a related issue(s) identifier field that includes the identifier(s) of any parent or child issues related to the given issue. These fields have been provided for descriptive purposes, however the issue data 124 may be considerably more complex and can have additional/different fields or tables that are linked in various different ways.

While a single ITS data store 123 is described, multiple separate data stores could be provided.

In certain embodiments, ITS 120 is a scalable system including multiple distributed server nodes connected to one or more shared data stores (e.g., shared file servers). Depending on demand from clients (and/or other performance requirements), ITS 120 server nodes can be provisioned/de-provisioned on demand to increase/decrease the number of servers offered by the ITS 120. Each ITS server 122 may run on a separate computer system and include one or more application programs, libraries, APIs or other software that implement server-side functionality. Similarly, the data store 123 may run on the same computer system as an ITS server application 122 or may run on their own dedicated system(s) (accessible to ITS server application(s) 122 either directly or via a communications network).

Communications between the various systems in environment 100 are via the communications network 102. Communications network may be a local area network, public network (e.g., the Internet), or a combination of both.

While environment 100 has been provided as an example, alternative system environments/architectures are possible.

The embodiments and features described herein are implemented by one or more special-purpose computing systems or devices. For example, in environment 100 each of the user device 110 and ITS 120 is or includes a type of computing system.

A special-purpose computing system may be hard-wired to perform the relevant operations described herein. Additionally, or alternatively, a special-purpose computing system may include digital electronic devices such as one or more application-specific integrated circuits (ASICs) or field programmable gate arrays (FPGAs) that are persistently programmed to perform the relevant operations. Further, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
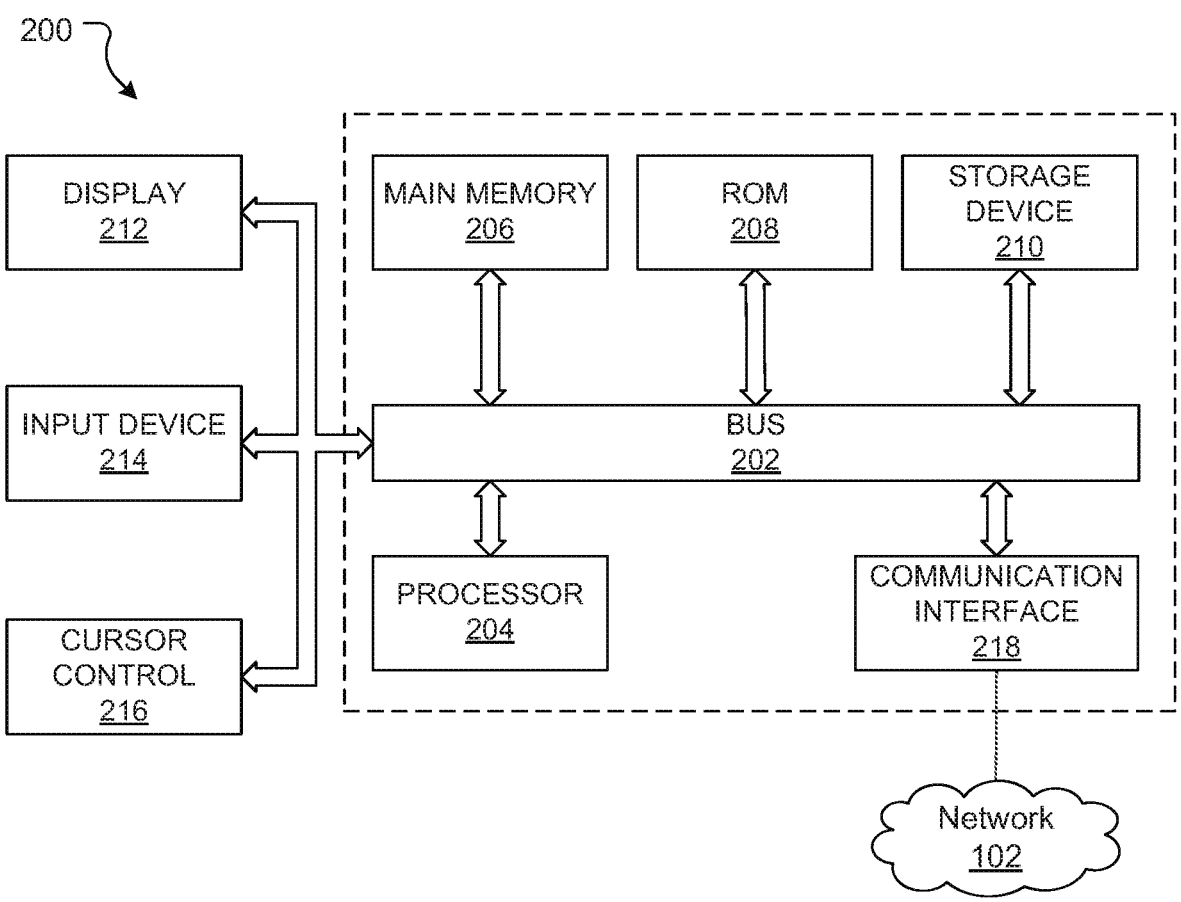
FIG. 2 is a block diagram of a computing system configurable to perform various features and embodiments of the present disclosure.

By way of example, FIG. 2 provides a block diagram that illustrates one example of a computer system 200, which may be configured to implement the embodiments and features described herein. Computer system 200 includes a bus 202 or other communication mechanism for communicating information, and a hardware processing unit 204 coupled with bus 202 for processing information. Hardware processing unit 204 may be, for example, a general-purpose microprocessor, a graphical processing unit, or other processing unit.

Computer system 200 also includes a main memory 206, such as a random-access memory (RAM) or other dynamic storage device, coupled to bus 202 for storing information and instructions to be executed by processing unit 204. Main memory 206 also may be used for storing temporary variables or other intermediate information during execution of instructions to be executed by processing unit 204. Such instructions, when stored in non-transitory computer readable storage media accessible to processing unit 204, render computer system 200 into a special-purpose machine that is customized to perform the operations specified in the instructions.

Computer system 200 further includes a read only memory (ROM) 208 or other static storage device coupled to bus 202 for storing static information and instructions for processing unit 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processing unit 204. Another type of user input device is cursor control 216, such as a mouse, a trackball, or cursor direction keys for communicating direction information and command selections to processing unit 204 and for controlling cursor movement on display 212.

According to one embodiment, the operations described herein are performed by computer system 200 in response to processing unit 204 executing one or more sequences of one or more instructions contained in main memory 206. Such instructions may be read into main memory 206 from another storage medium, such as a remote database. Execution of the sequences of instructions contained in main memory 206 causes processing unit 204 to perform the process steps described herein. In alternative embodiments, hard-wired circuitry may be used in place of or in combination with software instructions.

The term "storage media" as used herein refers to any non-transitory computer readable media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic, or optical signals that carry digital data streams representing various types of information.

Computer system 200 can send messages and receive data, including program code, through the network(s) 102, network link 220, and communication interface 218.

As noted, computer system 200 may be configured in a plurality of useful arrangements, and while the general architecture of system 200 may be the same regardless of arrangements, there will be differences. For example, where computer system 200 is configured as a server computer (e.g., such as ITS 120), it is typically provided with higher end hardware allowing it to process data, access memory, and perform network communications more rapidly than, for example, a user device (such as user device 110).

The ITS server application 122 (running on ITS 120) and ITS client application 112 (running on user device 110) operate together to provide an ITS and ITS functionality.

Many operations described herein as ITS operations or operations being performed by the ITS may be performed by the ITS client application 112 (operating on user device 110), the ITS server application 122 (operating on ITS 120), or the ITS client application 112 and ITS server application 122 in cooperation. For example, ITS operations involving the display of information involve displaying information on the user device 110 (e.g., on a display such as 212) as controlled by the ITS client application 112. The data displayed, however, may be generated by the ITS client application 112 itself, or generated by the ITS server application 122 and communicated to the ITS client application 112 therefrom. As a further example, ITS operations involving user input involve the user device 110 receiving user input (e.g., at input device 214) and passing that input to the ITS client application 112. The information input may be processed by the ITS client application 112 itself or communicated by the ITS client application 112 to the ITS server application 122 to be processed by the ITS server application 122. ITS operations involving writing data to the data stores 124, 126, 128 and 130 involve the ITS server application 122. The data written to a data store may, however, be communicated to the ITS server application 122 by the ITS client application 112.

One example of an ITS with which the present disclosure may be implemented is Jira, which is commercially available from Atlassian Pty Ltd., Sydney, Australia. For the purposes of explanation, the present disclosure will predominantly refer to Jira, however the features described herein could be applied to alternative ITSs.

An ITS provides users with the ability to create and track issues—or, more generally, work items. A work item is an item with associated information and an associated lifecycle—e.g., a series of states through which the work item transitions over its lifecycle. The lifecycle for a given work item may be simple (e.g., an open state and a closed state) or more complex (e.g., open, closed, resolved, in progress, reopened).

The particular information and lifecycle associated with a work item may vary greatly depending on the scenario in which the ITS is implemented. By way of example, an ITS may be implemented in a helpdesk scenario, in which case the work items may be issues or tickets logged with the helpdesk. An ITS may be implemented in a project management scenario, in which case the work items may be project tasks. An ITS may be implemented in a software development scenario, in which case work items may be bugs, current features under development, and/or features intended for further development. An ITS may be implemented in an organizational administration scenario, in which case work items may be administrative forms (e.g., leave request forms or the like). Many other ITS implementations in which different work items are tracked through different lifecycles are possible. For ease of reference, the following disclosure will refer to issues, however the features and operations described could apply to any other type of work item maintained by an ITS.

In order to facilitate the creation and tracking of issues, ITS 120 maintains ITS metadata (e.g., in issue data store 123) defining the operation of the ITS 100. Such metadata may include, for example: one or more lifecycle definitions, a lifecycle definition defining the lifecycle of an issue of a particular issue type (e.g., the states an issue can take and the manner in which an issue transitions between those states over its lifecycle); and user permissions (e.g., which users may create issues, view issues, amend issues, change the states of issues etc.).

ITS 120 may be configured to store a wide variety of information in respect of a given issue. By way of one simple example, an issue type definition may define the following fields: a project field storing a project to which the issue belongs; a key field storing a unique identifier for an issue; a description field storing a description of the issue and actions taken with respect to the issue; a status field indicating the stage the issue is currently at in its lifecycle; an assigned person field indicating who (if anyone) the issue has been assigned to; a severity field storing the severity of the issue (e.g. critical, major, minor, etc.); a priority field storing the priority of the issue at a general level (e.g. very high, high, medium, low, very low); and a rank field storing a rank value in respect of the issue (defining a rank order of the issue relative to other issues). Issue ranking is described in detail below. The actual fields defined with respect to an issue type depend on the requirements of a given ITS implementation, and many other fields are possible.

The lifecycle associated with a given issue also depends on the specific requirements of the ITS implementation. By way of a simple example, a lifecycle for use in a simple helpdesk implementation could involve the following states (and appropriate allowed transitions therebetween): an open state; an in-progress state; a resolved state; a closed state; and a reopened state. Different lifecycles with different states and/or transitions between states may be appropriate for different implementations.

In order to create and progress issues in ITS 120, users interact with appropriate user interfaces provided by an ITS client application 112. For example, a user may create a new issue and provide relevant information in respect of the issue (e.g., a particular project the issue is associated with, a description, a priority, any other relevant information catered for). The ITS 120 itself typically generates a key that can be used to uniquely identify the issue, which may be hidden from or visible to the user. Once an issue has been created a user can interact with it, for example by adding additional information to the issue (e.g., in an issue description or other field), changing the state of the issue (e.g., from in progress to resolved), assigning the issue to another person (e.g., by changing an assigned person field).

In the present embodiments, a hierarchy is defined for a project. This means that an instance of a hierarchy is independently defined for each project even though a given project may have some (or all) hierarchy levels in common with another project.

A given hierarchy level may have a parent hierarchy level (e.g., an immediately superior hierarchy level, e.g., current level +1) and/or a child hierarchy level (e.g., an immediately inferior hierarchy level, e.g., current level −1).

Once hierarchy levels for a project have been established, issue types are associated with those hierarchy levels.

In this disclosure, therefore, parent/child (e.g., hierarchy) relationships are defined at the issue type level. For example, if issue type A is associated with hierarchy level +1, any issue of type A that is created inherits this hierarchy. If issue type B is associated with hierarchy level 0, an issue that is of type A (level +1) cannot be a child of any issue that is of type B (level 0) as this would violate the established hierarchy. Conversely, an issue that is of type B (level 0) can be a child of an issue that is of type A (level +1) as this conforms to the established hierarchy. Such established hierarchical structures define the relationship rules that govern the relationships that any single issue may have. Thus, an action that causes the structure to be violated for any single issue is also referred to a breaking (one or more) relationship rules.

As indicated above, a hierarchy level can be defined with a number, which indicates a ranking of the hierarchy level. For example: a base level can be associated with the number '0'; a level above the base level with '1'; a level below the base level with '−1'; a level above the '+1' level with '+2'; a level below the '−1' level with '−2'; and so on. In practice, where hierarchy levels are defined with a number, the relationships of levels above and levels below are established based on the hierarchy level numbers being consecutive level numbers.

In certain implementation, the ranking of hierarchy levels is per project as issue types and hierarchy levels, along with associated relationship rules, can be defined by the user at a project level. That means that the issue types and hierarchy levels (and associations between including relationship rules) are not necessarily global but can be customized for an individual project. The issue types can be used to reflect either a degree of granularity of issues or a category of issues or both.

For example, an issue type such as 'epic' may typically be used for an issue at the level of a deployable feature released at the end of the timeline allocated for the epic. In other examples, an epic can be used as a general label for features, teams or activities that could happen at any time. These epics can be ongoing and do not necessarily need a clear end or timeline. In this case, an epic hierarchy level operates as a label showing what category an issue belonged to. Note that these example usages of issue types are described for illustrative purposes. There are many other issue types and usages of issue types that are contemplated by this disclosure.

Figure 3:
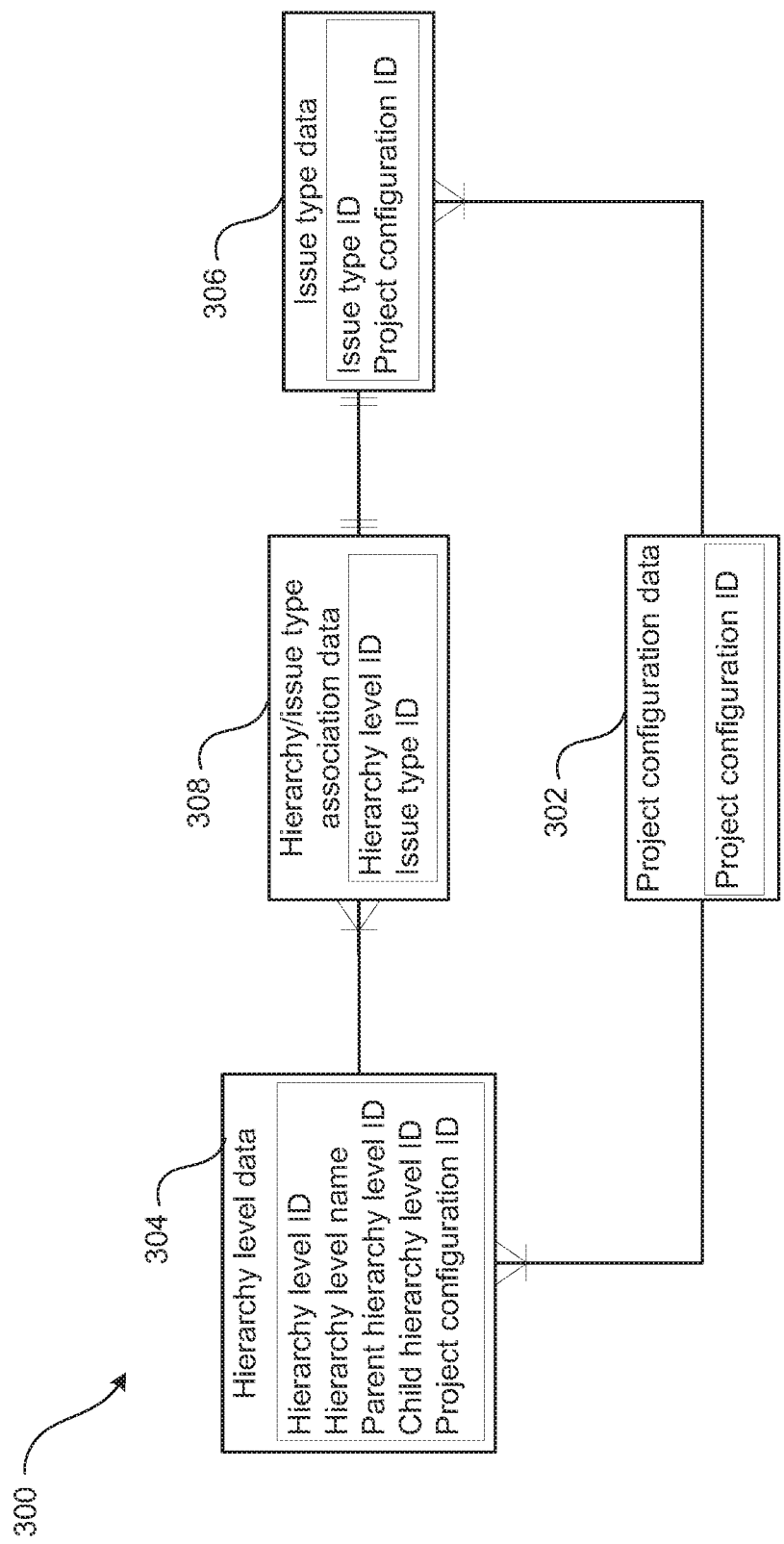
FIG. 3 is an example of data structures for storing issue type hierarchy data.

FIG. 3 is an illustrative example of how data in respect of issue type hierarchies may be stored. Specifically, FIG. 3 provides an example entity relationship (ER) diagram 300.

ER diagram 300 includes a project configuration data structure 302 (e.g., a database table) for creating records to store project configuration data 130. In the present example, the project configuration data structure 302 includes a project configuration identifier. Fields for storing additional data in respect of a particular project (or project configuration) could be provided, either in data structure 302 or in one or more additional data structures (linked with data structure 302 by use of a project configuration ID field).

ER diagram 300 includes a hierarchy level data structure 304 (e.g., a database table) for creating records to store hierarchy level data 126. In the present example, the hierarchy level data structure 304 includes: a hierarchy level identifier (to identify the hierarchy level); a hierarchy level name (e.g., a human readable name); a parent hierarchy level identifier (also a hierarchy level ID, used to identify a parent hierarchy level if one exists); and a project configuration identifier (used to identify a particular project configuration and thereby associate the hierarchy level with a particular project). Fields for storing additional hierarchy level data could be provided. For example, in certain embodiments the hierarchy level data structure 304 may include a field, which indicates whether the hierarchy level is a 'base' level for the project defined by the project configuration identifier. Base levels are levels which may have rules that, for example, prevent their deletion. Further fields for storing additional data associated with a particular hierarchy level could be provided, either in data structure 304 or in one or more additional data structures (linked with data structure 304 by use of a hierarchy level ID field).

ER diagram 300 includes an issue type data structure 306 (e.g., a database table) for creating records to store issue type data 128. In the present example, the issue type data structure 306 includes: an issue type identifier (to identify the issue type); and a project configuration identifier (used to identify a particular project configuration and thereby associate the hierarchy level with a particular project). Fields for storing additional data associated with a given issue type could be provided, either in data structure 306 or in one or more additional data structures (linked to data structure 306 by use of an issue ID field). For example, ITS 120 typically provides one or more additional tables/data structures for storing additional data associated with issue types—for example the fields available for use for a given issue type and the workflows (e.g., available states and state transitions) of a given issue type.

ER diagram 300 includes a hierarchy/issue type association data structure 308 (e.g., a database table) for creating records to store hierarchy/issue type association data 132. In the present example, the hierarchy/issue type association data structure 308 includes: a hierarchy level identifier and an issue type identifier. The hierarchy level identifier is used to identify a particular hierarchy level and thereby associate it with a particular issue type (as identified by the issue type identifier). Fields for storing additional data associated with a given hierarchy/issue type association could be provided (for example a date created field and/or other fields).

Using the various data above, a particular project configuration can be created and assigned a project configuration identifier. Using the project configuration identifier, the particular project can be associated with one or more issue type hierarchy levels (e.g., by creating a new hierarchy level data record for each issue type hierarchy level the particular project is to be associated with, each hierarchy level data record including the project configuration identifier for the particular project and a different hierarchy level identifier). Furthermore, using the project configuration identifier, the particular project can be associated with one or more issue types (e.g., by creating a new issue type data record for each issue type the project is to be associated with, each issue type data record including the project configuration identifier for the particular project and a different issue type identifier). Lastly, each issue type for the particular project can be associated with a particular hierarchy level (e.g., by creating a new hierarchy/issue type association record for each hierarchy/issue type association, each hierarchy/issue type association record including identifiers of an issue type and the hierarchy that issue type is to be associated with).

Alternative data structures (with additional and/or alternative fields) could be used to associate issue types with hierarchy levels (either on a per-project basis or more generally).

The hierarchy level data 126 includes data in relation to hierarchy levels. Hierarchy levels may be defined in various ways, however in the above example includes an identifier and a name for the hierarchy level. In some examples, the hierarchy levels may also include an identifier for the hierarchy level above and an identifier with the hierarchy level below. If a hierarchy level is the highest hierarchy level, then the hierarchy level above may be empty or null. If a hierarchy level is the lowest hierarchy level, then the hierarchy level below may be empty or null.

Figure 4:
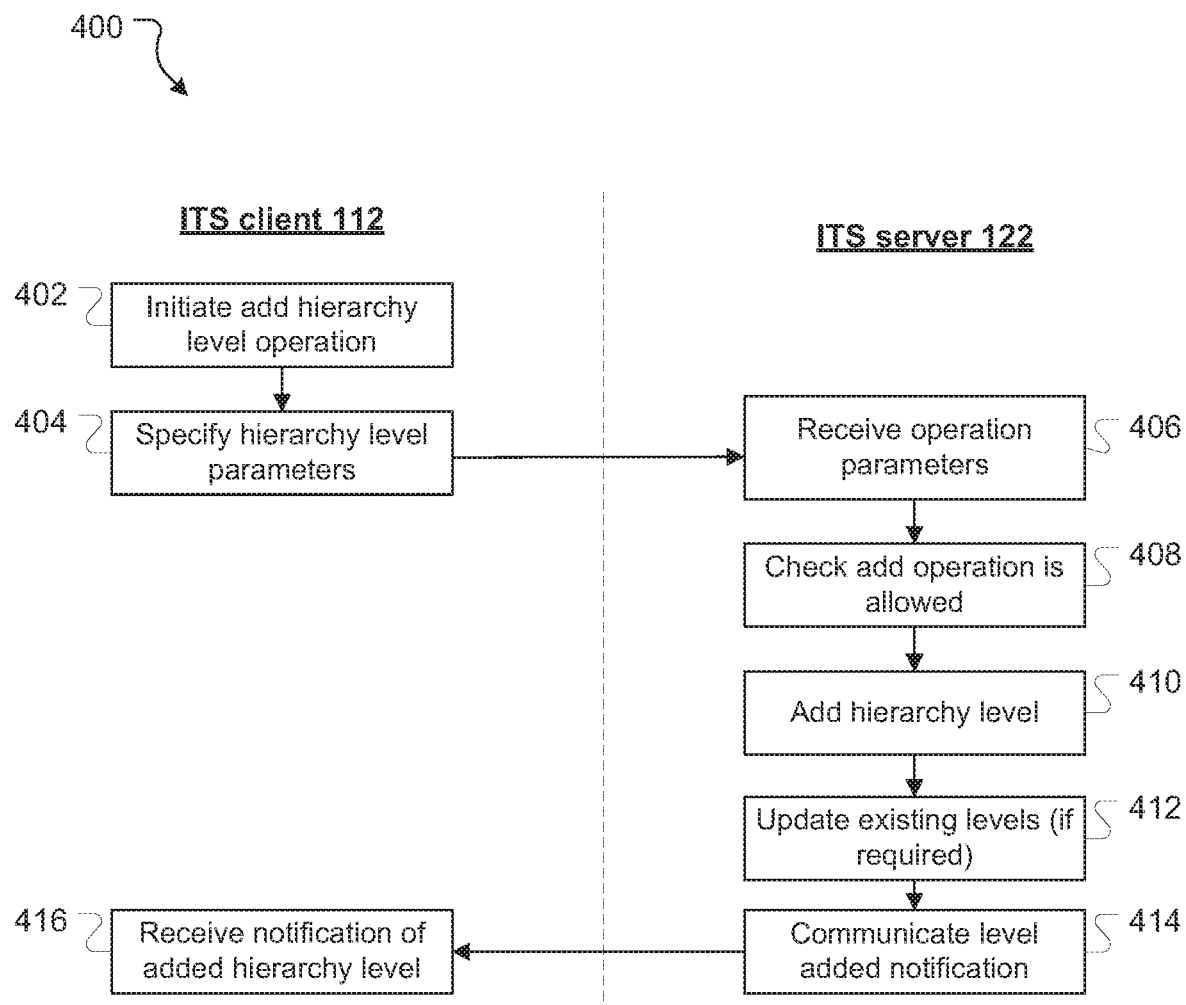
FIG. 4 is an example flowchart illustrating operations performed to add a hierarchy level to a project.

FIG. 4 illustrates an example method 400 for adding a hierarchy level to a project configuration.

At 402, a user interacts with user device 110 to initiate an add hierarchy level operation. This may be by any appropriate user interface(s) provided by ITS client application 112.

At 404, the user specifies relevant parameters for a new hierarchy level (again by use of one or more appropriate user interfaces). For example, a user may specify relevant parameters for the new hierarchy level: e.g., a name for the new level; a level at which the new hierarchy level is to be added; a description; a project to which the hierarchy level is to be added (where multiple projects are possible); and/or any other relevant information catered for. In order to specify a level at which the new level is to be added at, the user may request, for example, that the new hierarchy level be added: immediately above an existing level; immediately below an existing level; in between two existing levels. In this case, levels being identified by a hierarchy level identifier and/or hierarchy level name.

At 406, the ITS server 122 receives the add hierarchy level request and parameters from the ITS client 112.

At 408, the ITS server 122 determines whether the add hierarchy level operation is a valid operation. In some cases, adding a hierarchy level may be a restricted operation and may, for example, only be permissible if a level is being added between defined hierarchy levels (e.g., below the highest hierarchy level and/or above the lowest hierarchy level). That is, permissions may prevent adding a hierarchy level above the highest hierarchy level and/or below the lowest hierarchy level.

At 410, if the add operation is valid, the ITS server 122 adds the hierarchy level with the specified parameters. Referring to the ER diagram of FIG. 3 as discussed above, this involves creating a new hierarchy level record (per hierarchy level data structure 304) which includes details such as: an identifier of the level (the ITS server 122 itself may generate this identifier/key that can be used to uniquely identify the hierarchy level, and it may be hidden from or visible to the user); a name of the level (which may be defined by the user creating the level), and a project configuration identifier (which may be defined by the user or retrieved by the ITS server 122). In some embodiments, the new hierarchy level record may further include a parent level identifier (if the new level has a parent level); a child level identifier (if the new level has a child level).

If the parameters specify that the new level is to be added above a particular level, the ITS server 122 sets the child level ID for the new hierarchy level record to the ID of the particular level. If the particular level the new level is being added above already had a parent level, the ITS server 122 sets the parent level ID for the new hierarchy level record to be the ID of the particular level's parent level. If the particular level the new level is being added above did not have a parent level, the ITS server 122 leaves the parent level ID for the new hierarchy level record blank (or sets it to a value indicating there is no parent level).

If the parameters specify that the new level is to be added below a particular level, the ITS server 122 sets the parent level ID for the new hierarchy level record to the ID of the particular level. If the particular level the new level is being added below already had a child level, the ITS server 122 sets the child level ID for the new hierarchy level record to be the ID of the particular level's child level. If the particular level the new level is being added below did not have a child level, the ITS server 122 leaves the child level ID for the new hierarchy level record blank (or sets it to a value indicating there is no child level).

If the parameters specify that the new level is to be added between two existing levels (an above level and a below level), the ITS server 122 sets the parent level ID for the new hierarchy level record to the level ID of the above level and the child level ID for the new hierarchy level record to the level ID of the below level.

At 412, and if required, the ITS server 122 accesses any relevant existing hierarchy level records in order to edit their parent/child hierarchy level identifiers to account for the newly added record.

If the new level is a parent to an existing level, the ITS server 122 edits the 'parent hierarchy level ID' of the existing level to refer to the level identifier of the new hierarchy level.

If the new level is a child to an existing level, the ITS server 122 edits the 'child hierarchy level ID' of the existing level to refer to the level identifier of the new hierarchy level.

At 414, the ITS server 122 generates and communicates a level added notification to the ITS client 112.

At 416, the ITS client receives the hierarchy level added notification. The user can then perform various operations regarding the hierarchy level, for example renaming the hierarchy level, moving (e.g., changing the level of) the hierarchy level, deleting the hierarchy level, querying issue types or issues associated with the hierarchy level, associating issue types with the hierarchy level, deleting issue types associated with the hierarchy level, and/or other operations. Such operations are set out in co-owned U.S. patent application Ser. No. 16/833,299, which is incorporated herein in its entirety.

Figure 5:
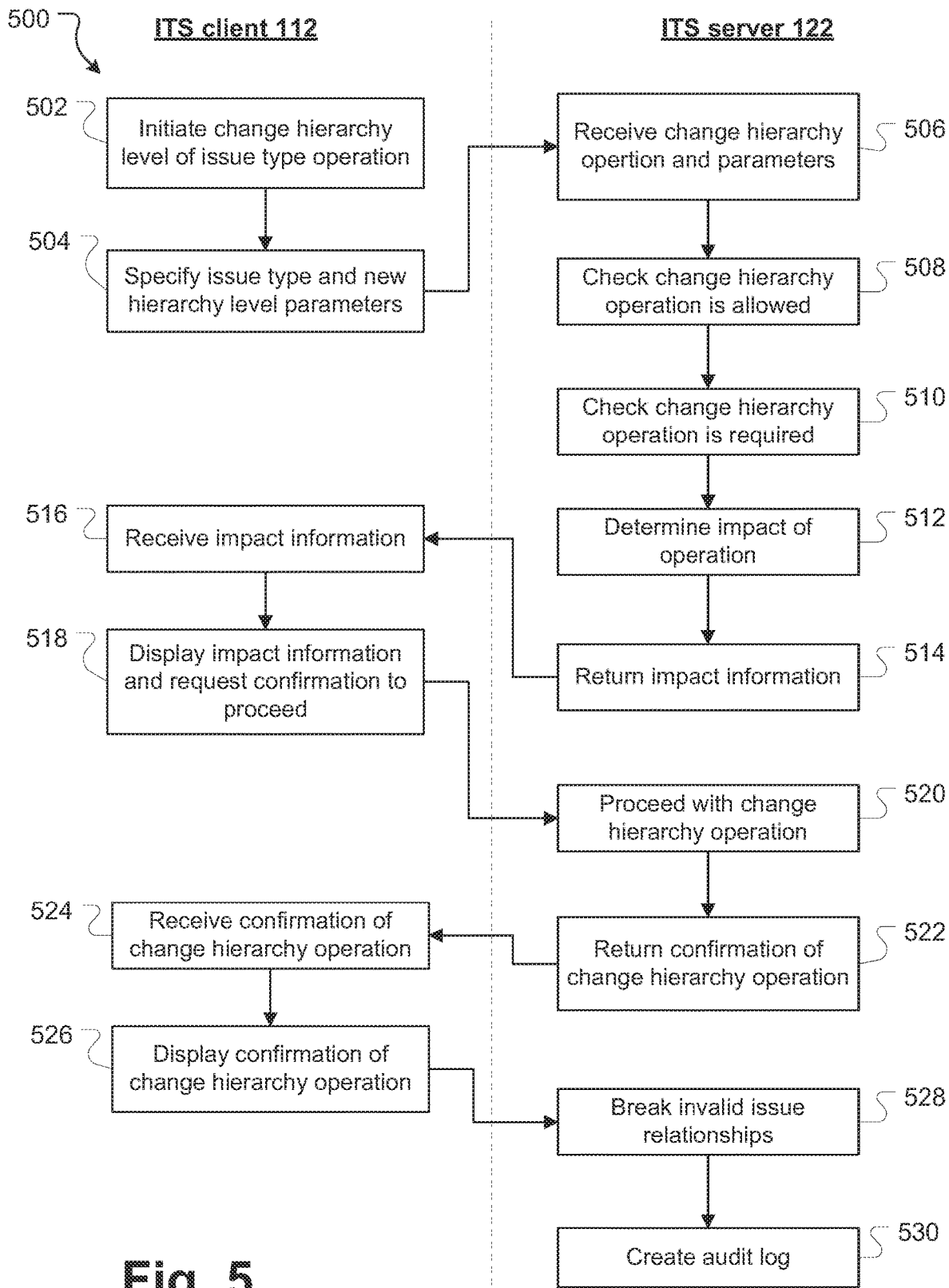
FIG. 5 is an example flowchart illustrating operations performed to change a hierarchy level of a chosen issue type.

FIG. 5 illustrates an example process 500 for changing the associated hierarchy level of an issue type and the subsequent changes to individual issue relationships. In the present example, this requires at least two hierarchy levels to have been added to a project (e.g., per process 400 described above), in that: a first hierarchy level exists otherwise there may be no current hierarchy level to associate with the issue type; and at least one further hierarchy level exists otherwise there may be no new hierarchy level to associate with the issue type. In practice, configuring the ITS so that projects are created with at least two default hierarchy levels (e.g., a base parent level and a base child level) may alleviate this problem.

At 502, a user interacts with one or more appropriate user interfaces provided by the ITS client application 112 to initiate an operation to change an associated hierarchy level of a chosen issue type.

At 504, the user interacts with one or more appropriate user interfaces provided by the ITS client application 112 to specify parameters for the operation—specifically, the user may specify information in respect of the chosen issue type (e.g., an issue type name and/or identifier of the chosen issue type) and a new hierarchy level (e.g., a hierarchy level name and/or identifier) to associate with the chosen issue type. It is noted that the chosen issue type has a current associated hierarchy level.

At 506, the ITS server 122 receives the operation to change the associated hierarchy level of the chosen issue type and the specified parameters from the ITS client 112.

At 508, the ITS server 122 determines whether the change of hierarchy level operation is a valid operation. In some cases, changing an associated hierarchy level of an issue type may be a restricted operation and may, for example, only be permissible to certain authorised users. That is, permissions may prevent an unauthorised user changing an associated hierarchy level of an issue type.

Assuming the operation is permissible, at 510, the ITS server 122 verifies that the new hierarchy level is different to the present hierarchy level. To this end, the ITS server 122 may query the ITS data store 123 and in particular the issue type data 128 and the hierarchy level data 126 to determine the present hierarchy level of the selected issue type. If the ITS server 122 determines that the new hierarchy level is the same hierarchy level as currently associated with the chosen issue type, then no action is required as the desired hierarchy level is already associated with the chosen issue type. In this case no action is taken by the ITS server 122 other than to initiate a message to the user that "no action is required" (or the like).

Assuming the new hierarchy level is different to the current hierarchy level of the chosen issue type, at 512, the ITS server 122 determines the effect of the change on existing relationships between issue types and also determines if any relationship rules may be broken as a result of the change. In other words, the ITS server 122 determines which relationships, if any, that existed between issues prior to the change become invalid as a result of the change. Any relationships that are determined to be invalid as a result of the change are subsequently broken. The manner in which the ITS server 122 makes this determination is described in FIG. 6.

At 514, the ITS server 122 returns impact information to the user as to the effect of proceeding with the change of hierarchy level of the chosen issue type, specifically what relationships may need to be broken as a result of proceeding with the change.

At 516, the ITS client application 112 receives the impact information.

At 518, the ITS client application 112 causes the impact information to be displayed or otherwise presented and the user is prompted to confirm if they wish to proceed with the change given the impact on relationships.

Assuming the user confirms to proceed with the change, at 520, the ITS server 122 makes the change by associating the new hierarchy level with the chosen issue type. This process involves updating records that store hierarchy/issue type association data 132 to change the associated hierarchy level of the chosen issue type.

At 522, the ITS server 122 returns confirmation of the change of hierarchy level of the chosen issue type.

At 524, the ITS client application 112 receives the confirmation of the change of hierarchy level of the chosen issue type.

At 526, the ITS client application 112 causes the confirmation of the change of hierarchy level of the chosen issue type to be displayed or otherwise presented, which will be described further below.

At 528, at a time at or following the change of associating the new hierarchy level with the chosen issue type, the ITS server 122 commences breaking relationships that existed between issues that have become invalid as a result of the change. This process includes ITS operations involving writing data to the data stores 124, 126, 128 and 130 by the ITS server application 122. More specifically, the process includes breaking relationships between issues that were displayed in the impact information at step 518. This may include starting with a list of affected child issues of the chosen issue type as a parameter and removing the issue-parent relationships of those child issues.

At 530, the ITS server 122 creates a record of changes that are captured in an audit log. Such a log is accessible to a user (requested by the user through one or more appropriate user interfaces provided by the ITS client application 112) so that a viewable record of the changes is maintain. Such information may allow the changes to be reversed including recovering previous relationship data should it be requested by a user.

Figure 6:
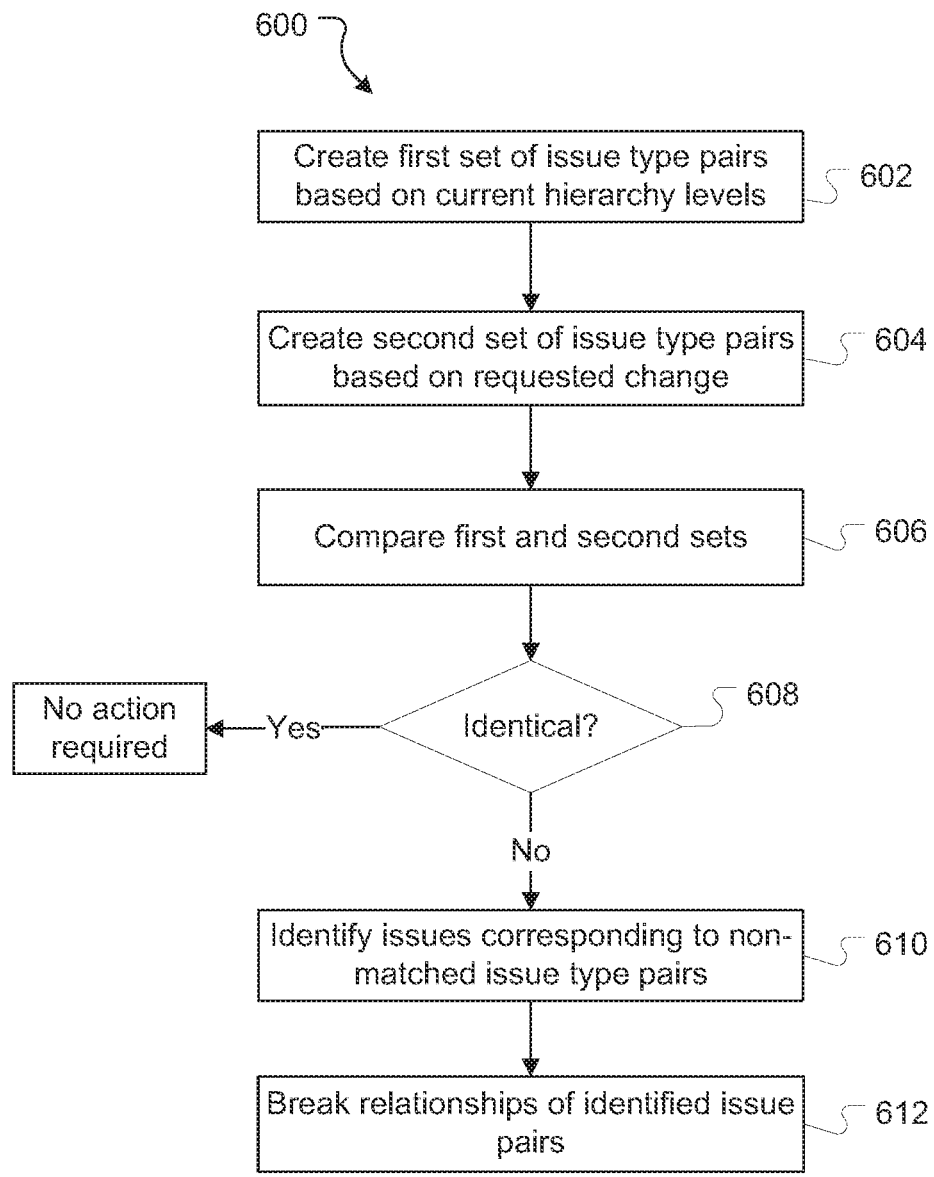
FIG. 6 is an example flowchart illustrating an example process for determining the impact of a hierarchy change operation and breaking invalid issue relationships according to some aspects of the present disclosure.

FIG. 6 is a flowchart illustrating an example method for determining which issue relationships may be affected by a change in hierarchy levels of an issue type (e.g., at step 512) and breaking those relationships in response to receiving user confirmation (e.g., at step 528). The method 600 commences at step 602, where the ITS server 122 creates a first set of unique parent-child issue type pairs based on current hierarchy levels. For example, if a project includes three hierarchy levels—0, 1, and 2 for three issue types—Subtask, Task, and Epic, respectively, the ITS server 122 creates two parent-child issue type pairs as "Epic-Task" (for the hierarchy levels 2-1) and "Task-Subtask" (for the hierarchy levels 1-0).

At 604, the ITS server 122 creates a second set of unique issue parent-child issue type pairs based on the request to change the hierarchy level of the selected issue type received at step 504. In particular, the ITS server 122 creates new hierarchy levels based on the requested change and then creates the second set of unique parent-child issue type pairs based on the new hierarchy levels. For example, considering the scenario described above, a user may wish to change the hierarchy level of Sub-tasks from 0 to 1. That is, the user may request that Sub-tasks and Tasks be sibling issue types under the Epic parent issue type. In this case, the new hierarchy levels for that project become—2, 1, and 1 for the three issue types—Epic, Task, and Sub-task, respectively. In this case, the ITS server 122 creates two parent-child issue type pairs based on the new hierarchy levels as "Epic-Task" (for the hierarchy levels 2-1) and "Epic-Sub-task" (for the hierarchy levels 2-1).

At 606, the ITS server 122 compares the two sets of parent-child issue pairs to determine whether there are any parent-child issue pairs in the first set that are not present in the second set. If the ITS server 122 determines that there are no parent-child issue type pairs in the first set that are not present in the second set, the ITS server 122 determines that no relationships need to be broken at step 607 and the method ends. If this happens, the impact information determined at step 512 may indicate that no issue relationships will be impacted by the operation.

Additionally, or alternatively, if at step 606, the ITS server 122 determines that there are one or more parent-child issue type pairs in the first set that does not present in the second set, the ITS server 122 determines that some issue relationships may need to be broken and the method proceeds to step 608, where the ITS server 122 determines these issue pairs. For example, considering the scenario described above, the ITS server 122 may determine that the second set of parent-child issue type pairs does not include the "Task-Sub-task" pairing. Based on this, it may determine that task-sub-task issue pairings in the project may need to be broken.

At step 608, the ITS server 122 identifies the Task issues that have associated Sub-tasks by performing a lookup in the issue data 124 for issues that have a Task issue type and then identifying issues within that subset that have associated issues of the Sub-task type.

At step 512, the ITS server 122 may return this list of identified task-sub-task issue pairs as part of the impact information.

Once the affected issue pairs are identified, the method proceeds to step 610 where the ITS server 122 breaks the invalid relationships. This involves writing data to one or more of the data stores 124, 126, 128, and 130.

In further embodiments, based on the data comparison at 610, the ITS server 122 also identifies any issue pair or pairs in the second set that are unique from any issue pair of the first set. In other words, it is determined which issue pairs of the second set would exist following the request to change the associated hierarchy level of the chosen issue type but did not previously exist prior to the request to change the associated hierarchy level of the chosen issue type (and are therefore not present in the first set). Such a comparison identifies the relationships that are new as a result of the request, and hence relationships that can be created between issues as a result of the change. For instance, in the example discussed above, the ITS server 122 may determine that the "Epic-sub-task" pairing is new and that relationships can be created between Epics and sub-tasks that currently exist in that project.

It is noted that the process of the ITS server 122 breaking relationships is asynchronous to the updating of the hierarchy level of the chosen issue type. This is because the process of breaking relationships can be time consuming if there are a great number of individual issues of the chosen issue type. Therefore, the ITS server 122 carries out this process whilst allowing the user to continue using the ITS client application 112 without the downtime that would otherwise be present if further actions could not be made before full completion of the relationship breaking process.

An example where the above process would be applicable is where there presently existed in a project:
An issue X having an issue type A which is associated with a hierarchy level 0;
An issue Y having an issue type B which is associated with a hierarchy level +1; and
An issue Z having an issue type C which is associated with a hierarchy level −1.

Then, by the relationship rules, issue X can have a child-parent relationship with issue Y, where issue Y is the parent (being associated with a higher hierarchy level of +1) and issue X is the child (being associated with a lower hierarchy level of 0). Further, by the relationship rules, issue X can have a parent-child relationship with issue Z, where issue X is the parent (being associated with a higher hierarchy level of 0) and issue Z is the child (being associated with a lower hierarchy level of −1).

If a user requests that the associated hierarchy level of issue type A is changed from level 0 to level +1, the level is updated as per process 500 which causes the respective relationships of issue X with issues Y and Z to become invalid as they are no longer adjacent hierarchy levels in line with the relationship rules. In other words, issue X of issue type A now being associated with hierarchy level +1 would no longer have a valid child-parent relationship with issue Y as both issues X and Y would be associated with hierarchy level +1 and the associated hierarchy levels of issues X and Y are no longer adjacent hierarchy levels (as they are now the same level). Further, issue X would no longer have a valid parent-child relationship with issue Z as issue X would be associated with hierarchy level +1 and issue Z would be associated with hierarchy level −1 and the associated hierarchy levels of issues X and Z are no longer adjacent hierarchy levels (as they are now two levels removed from each other). Therefore, process 500 involves breaking the invalid relationships of issue X with issues Y and Z (along with breaking any other issues of type A that have invalid relationships).

Once a relationship is broken, what is presented to the user by ITS client application 112 is as if that relationship never existed. Examples of how such a change may be represented to the user is shown in FIGS. 7A, 7B and 7C where there is illustrated example wireframes of the user interface provided by ITS client application 112.

Figure 7A:
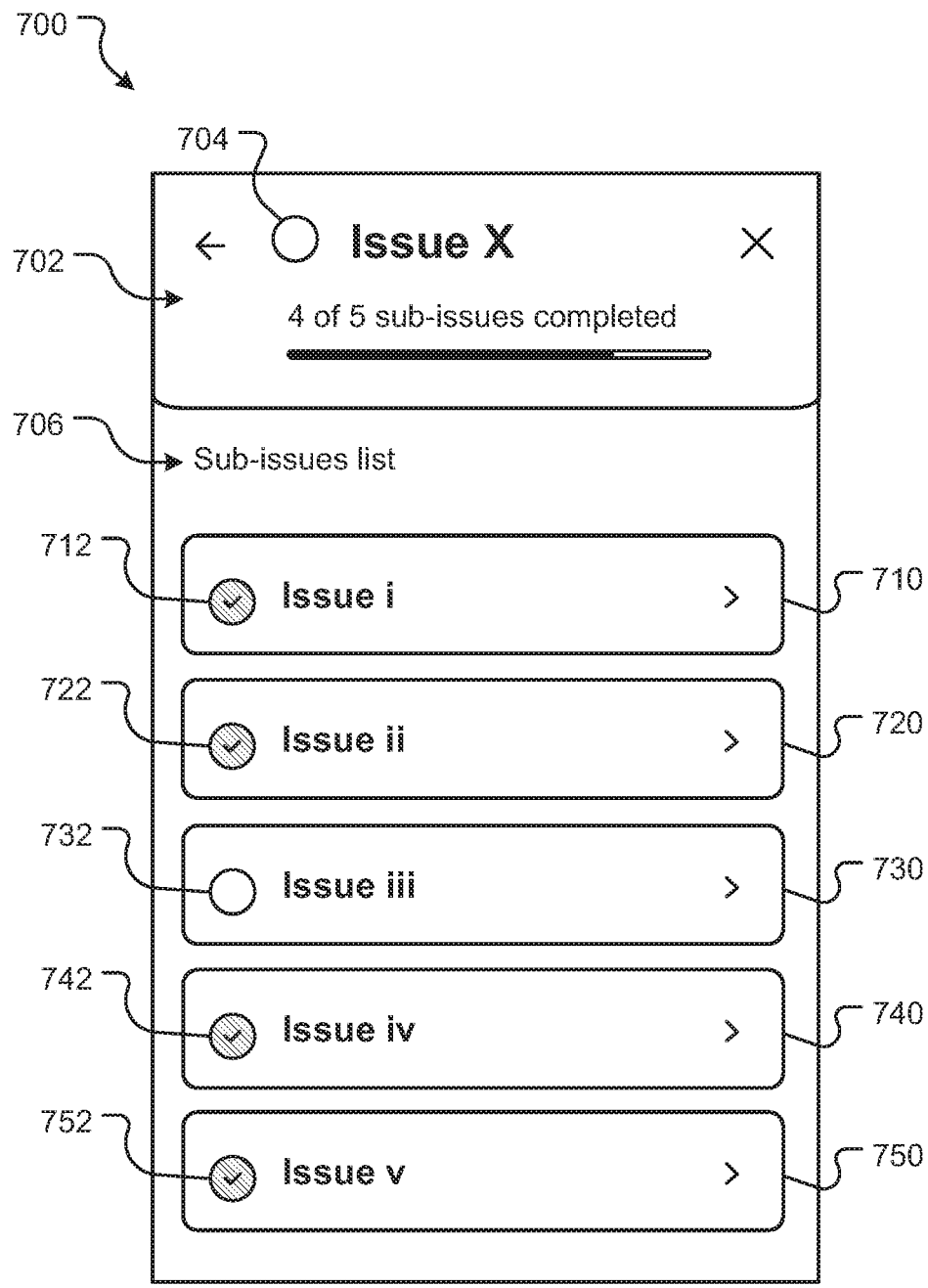
FIGS. 7A, 7B and 7C are examples of wireframes of a user interface provided by an ITS client application of the networked environment of FIG. 2.

Referring initially to FIG. 7A, user interface 700 shows the details of a specific issue, Issue X (denoted by reference 702) which is the same as issue X from the example above and therefore having issue type A which is associated with hierarchy level 0. As seen in FIG. 7A, the user interface of the ITS client application 112 presents the user with visual indication of the progress of completion of Issue X at 702 in the form of a progress bar. In FIG. 7A, Issue X is indicated as not being completed (denoted by an empty circle 704) and a text description of the progress bar that "4 of 5 sub-issues completed" meaning that 4 of the total number of 5 sub-issues has been completed. In order for Issue X to be completed, all of the 5 sub-issues must be completed. User interface 700 also includes a text description of the sub-issues of Issue X at 706, in the example "Sub-issue list". Each of the sub-issues are then listed, those being Issue i (denoted by reference 710), Issue ii (denoted by reference 720), Issue iii (denoted by reference 730), Issue iv (denoted by reference 740), and Issue v (denoted by reference 750). Further, each of Issues i, ii, iii, iv and v include respective completion indicators which are as follows: Issue i is indicated as being completed (denoted by a ticked circle 712), Issue ii is indicated as being completed (denoted by a ticked circle 722), Issue iii is indicated as being not completed (denoted by an empty circle 732), Issue iv is indicated as being completed (denoted by a ticked circle 742), and Issue v is indicated as being completed (denoted by a ticked circle 752). In this example, each of Issues i, ii, iii, and iv are of issue type C which is associated with hierarchy level −1, and Issue v is of an issue type D which is also associated with hierarchy level −1. Therefore, there is a valid relationship between Issue X and each of Issues i, ii, iii, iv and v whereby Issue X is a parent being of hierarchy level 0 and each of Issues i, ii, iii, iv and v are children being of hierarchy level −1. In other words, Issue X and Issue i have a parent-child relationship, Issue X and Issue ii have a parent-child relationship, Issue X and Issue iii have a parent-child relationship, Issue X and Issue iv have a parent-child relationship, and Issue X and Issue v have a parent-child relationship. It will be appreciated that each sub-issue can be expanded to reveal details of that sub-issue.

Although each of Issue X and Issues i, ii, iii, iv and v in this example are single letters/numbers and Issues i, ii, iii, iv and v are numbered consecutively, it will be appreciated that in practice the issues are often given names by the user that briefly describe the issue (e.g., instead of Issue X this issue could be "Team hardware update" and Issues i to v could be team member names whose hardware may be updated such as "Jane," "Jim," "John," "Joanna," and "Jill").

Figure 7B:
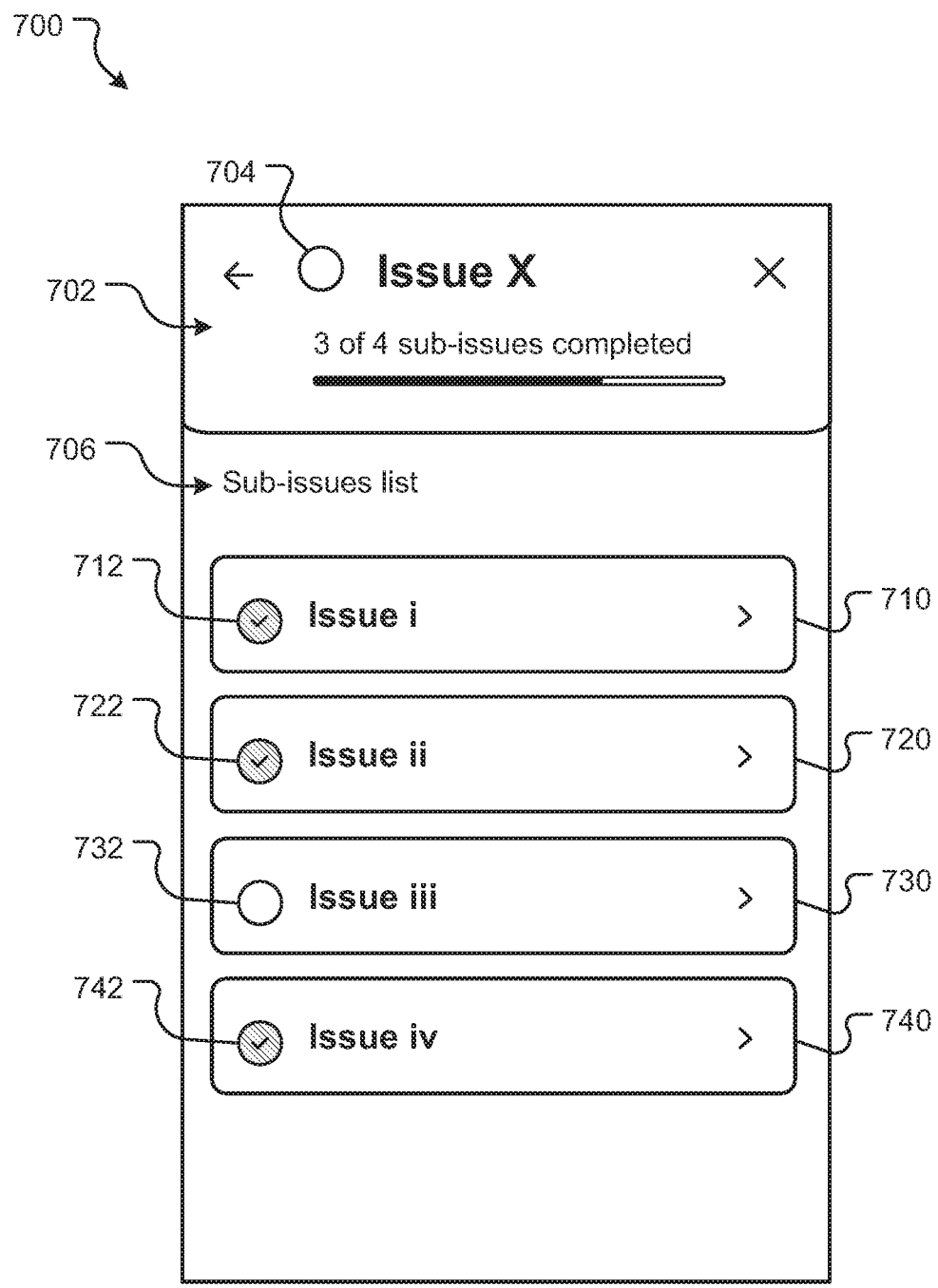
Figure 7C:
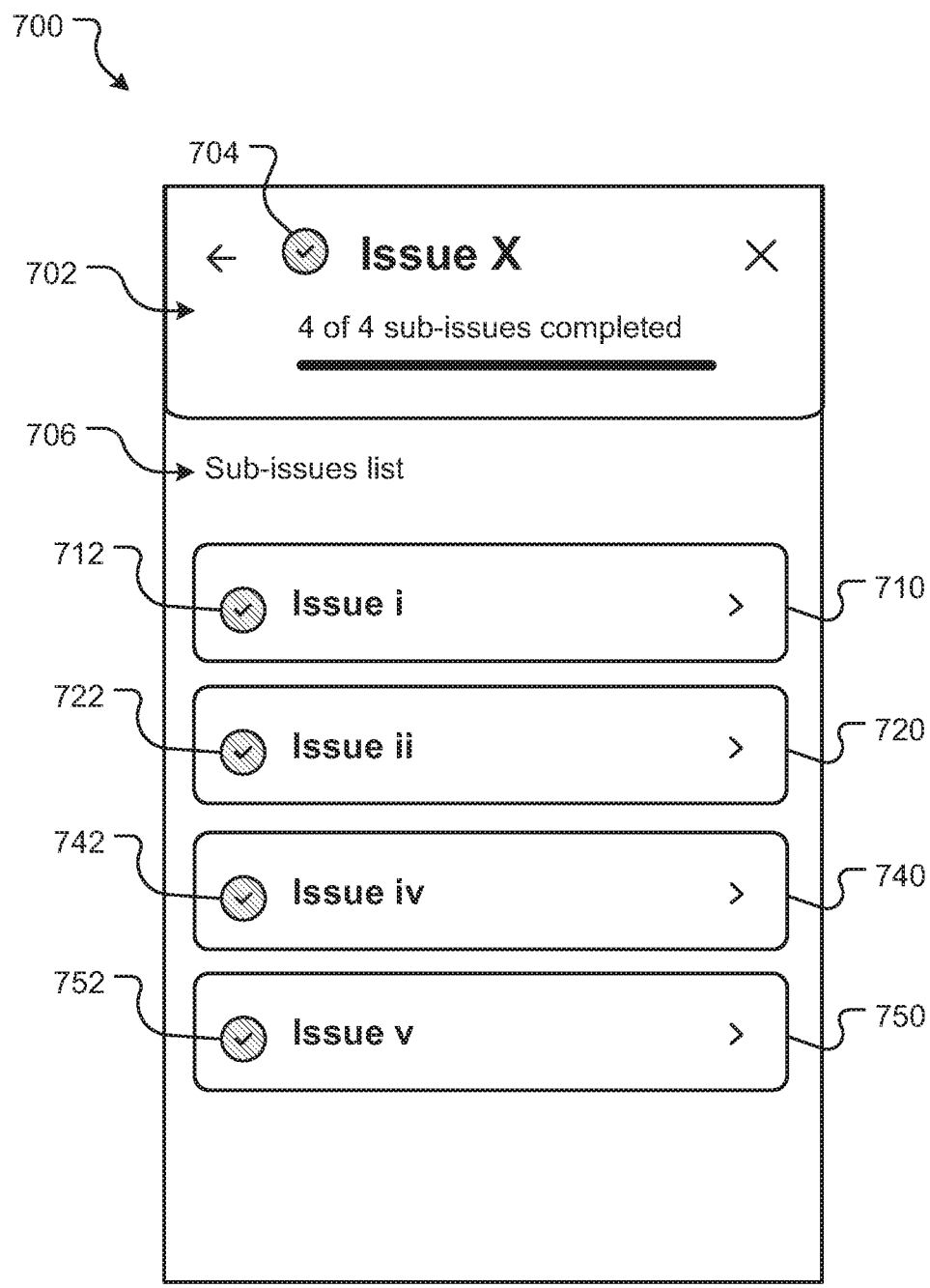

Referring now to FIG. 7B, there is shown the outcome of when the user changes the associated hierarchy level of issue type D (following step 526 of process 500). For example, the user requests the associated hierarchy level of issue type D to change to hierarchy level +1 as per process 500 described above. This causes Issue X and Issue v to have an invalid relationship as the previous parent-child relationship is no longer valid given the hierarchy level of Issue X is 0 and the new hierarchy level of Issue v is +1. The ITS server 122 then takes steps to break this invalid relationship (at step 528 of process 500) and this results in Issue X no longer being related to Issue v. The result is shown in user interface 700 of FIG. 7B where Issue v is no longer shown as a sub-issue of Issue X. Further, the visual indication of the progress of completion of Issue X at 702 now displays an updated progress bar and an updated text description that "3 of 4 sub-issues completed" meaning that 3 of the new total number of 4 sub-issues has been completed. Now, in order for Issue X to be completed, all of the 4 of the remaining sub-issues must be completed.

In another example, Issue X is again of issue type A, which is associated with hierarchy level 0, each of Issues i, ii, iv, and v are of issue type C which is associated with hierarchy level −1, and Issue iii is of issue type D which is also associated with hierarchy level −1. Therefore, there is a valid relationship between Issue X and each of Issues i, ii, iii, iv and v whereby Issue X is a parent being of hierarchy level 0 and each of Issues i, ii, iii, iv and v are children being of hierarchy level −1. In other words, Issue X and Issue i have a parent-child relationship, Issue X and Issue ii have a parent-child relationship, Issue X and Issue iii have a parent-child relationship, Issue X and Issue iv have a parent-child relationship, and Issue X and Issue v have a parent-child relationship.

Referring now to FIG. 7C, there is shown the outcome of when the user changes the associated hierarchy level of issue type D (following step 526 of process 500). For example, the user requests the associated hierarchy level of issue type D to change to hierarchy level +1 as per process 500 described above. This causes Issue X and Issue iii to have an invalid relationship, as the previous parent-child relationship is no longer valid given the hierarchy level of Issue X is 0 and the new hierarchy level of Issue iii is +1. The ITS server 122 then takes steps to break this invalid relationship (at step 528 of process 500) and this results in Issue X no longer being related to Issue iii. The result is shown in user interface 700 of FIG. 7C where Issue iii is no longer shown as a sub-issue of Issue X. Further, the visual indication of the progress of completion of Issue X at 702 now displays an updated progress bar and an updated text description that "4 of 4 sub-issues completed" meaning all of the new total number of 4 sub-issues have been completed since Issue iii was previously the only incomplete sub-issue of Issue X. Therefore, Issue X is indicated as being completed (denoted by a ticked circle 704).

Similar changes may be made for other such details of an issue where a certain sub-issue is removed as a related issue. For example, where a plurality of related sub-issues each have a unique completion deadline for, the completion deadline of the parent issue of the sub-issues may be the latest of the completion deadlines of the plurality of related sub-issues. If a change is made to the hierarchy of the issue type of the sub-issue which has the latest of the completion deadlines (and therefore the present completion deadline of the parent issue) and the relationship of that sub-issue and the parent issue become invalid, the ITS server 122 then takes steps to break this invalid relationship and hence remove it as a sub-issue of the parent issue. This may result in the completion deadline of the parent issue changing to the latest of the completion deadlines of the one or more remaining related sub-issues.

In the foregoing specification, various embodiments have been described with reference to numerous specific details that may vary from implementation to implementation. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including," "includes," "comprising," "comprises," "comprised," and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
    establishing a project hierarchy with a plurality of hierarchy levels including a first hierarchy level and a second hierarchy level, the first hierarchy level having an associated first issue type;
    receiving, from a user device, a request to change the first hierarchy level associated with the first issue type to the second hierarchy level; and
    in response to receiving the request to change the first hierarchy level associated with the first issue type to the second hierarchy level:
        accessing, from a data store, a hierarchy-issue type association data record of the first issue type including an identifier of the first issue type and a current hierarchy level identifier corresponding to the first hierarchy level;
        creating a first set of parent-child issue type pairs based on a current state of the plurality of hierarchy levels;
        creating a new hierarchy-issue type association data record including the identifier of the first issue type and a new hierarchy level identifier corresponding to the second hierarchy level;

associating the first issue type with the second hierarchy level by storing the new hierarchy-issue type association data record in the data store;

creating a second set of unique parent-child issue type pairs based on a new state of the plurality of hierarchy levels, the new state of the plurality of hierarchy levels based on the request to change the hierarchy level associated with the first issue being implemented;

determining that a particular parent-child issue type pair in the first set of parent-child issue type pairs is absent in the second set of parent-child issue type pairs; and in response to determining that the particular the parent-child issue type pairs in the first set are absent in the second set, determining that a particular relationship of the first issue type will be affected by changing the hierarchy level of the first issue type from the first hierarchy level to the second hierarchy level.

2. The computer-implemented method of claim 1, wherein:

the data store stores a plurality of issues, wherein each issue is associated with an issue type, one or more issues of the plurality of issues are related to one or more other issues of the plurality of issues according to a parent-child relationship, and the parent-child relationship information is stored in the data store; and upon determining that the particular parent-child issue type pair in the first set of parent-child issue pairs are absent in the second set of parent-child issue pairs, identifying, in the data store, parent issues associated with the particular parent issue type and identifying one or more child issues of a child issue type of the particular parent-child issue type pairs that are related to the parent issues based on the relationship information.

3. The computer-implemented method of claim 2, further comprising breaking relationships between the parent issues and the child issues, wherein breaking the relationships between the parent issues and the child issues includes updating the relationship information of the parent and child issues in the data store.

4. The computer-implemented method of claim 2, further comprising:

generating impact information including identifiers of the parent issues and the child issues; and communicating the impact information to the user device for displaying on a display of the user device.

5. The computer-implemented method of claim 4, further comprising:

receiving confirmation from the user device to change the hierarchy level of the first issue type subsequent to communicating the impact information to the user device; and creating the new hierarchy-issue type association data record and associating the first issue type with the second hierarchy level in response to receiving the confirmation from the user device.

6. A system, comprising:

a processing unit;

a communication interface;

a non-transitory computer-readable storage media comprising instructions which, when executed by the processing unit, cause the processing unit to:

establish a project hierarchy with a plurality of hierarchy levels including a first hierarchy level and a second hierarchy level, the first hierarchy level having an associated first issue type;

receive, from a user device, a request to change the first hierarchy level of the first issue type from the first hierarchy level to the second hierarchy level; and in response to receiving the request to change the first hierarchy level of the first issue type from the first hierarchy level to the second hierarchy level:

access, from a data store, a hierarchy-issue type association data record of the first issue type including an identifier of the first issue type and a current hierarchy level identifier corresponding to the first hierarchy level;

create a first set of unique parent-child issue type pairs based on a current state of the plurality of hierarchy levels;

create a new hierarchy-issue type association data record including the identifier of the first issue type and a new hierarchy level identifier corresponding to the second hierarchy level;

associate the first issue type with the second hierarchy level by storing a new hierarchy/issue type association data record in the data store;

create a second set of unique parent-child issue type pairs based on a new state of the plurality of hierarchy levels, the new state of the plurality of hierarchy levels based on the request to change the hierarchy level of the first issue type being implemented;

determine that a particular parent-child issue type pair in the first set of parent-child issue type pairs are absent in the second set of parent-child issue type pairs; and in response to determining that the particular parent-child issue type pair in the first set of parent-child issue type pairs are absent in the second set of parent-child issue type pairs, determine that one or more issue relationships will be affected by changing the hierarchy level of the first issue type from the first hierarchy level to the second hierarchy level.

7. The system of claim 6, wherein:

the data store stores a plurality of issues, wherein each issue is associated with an issue type, one or more issues of the plurality of issues are related to one or more other issues of the plurality of issues according to a parent-child relationship, and the parent-child relationship information is stored in the data store; and upon determining that the particular parent-child issue type pair in the first set of parent-child issue type pairs are absent in the second set of parent-child issue type pairs, the non-transitory computer-readable storage media further comprising instructions which, when executed by the processing unit, cause the processing unit to identify, in the data store, parent issues of the parent issue type of the particular parent-child issue type pairs and identifying one or more child issues of a child issue type of the particular parent-child issue type pair that are related to the parent issues based on the relationship information.

8. The system of claim 7, wherein the non-transitory computer-readable storage media further comprising instructions which, when executed by the processing unit, cause the processing unit to break relationships between the parent issues and the child issues, wherein breaking the relationships between the parent issues and the child issues includes updating the relationship information of the parent and child issues in the data store.

9. The system of claim 7, where the non-transitory computer-readable storage media further comprising instructions which, when executed by the processing unit, cause the processing unit to:
  generate impact information including identifiers of the parent issues and the child issues; and
  communicate the impact information to the user device for displaying on a display of the user device.

10. The system of claim 9, wherein the non-transitory computer-readable storage media further comprising instructions which, when executed by the processing unit, cause the processing unit to:
  receive confirmation from the user device to change the hierarchy level of the first issue type subsequent to communicating the impact information to the user device; and
  create the new hierarchy-issue type association data record and associate the first issue type with the second hierarchy level in response to receiving the confirmation from the user device.

11. A non-transitory computer-readable storage media comprising instructions which, when executed by a processing unit, cause the processing unit to:
  establish a project hierarchy with a plurality of hierarchy levels including a first hierarchy level and a second hierarchy level, the first hierarchy level having an associated first issue type;
  receive, from a user device, a request to change the first hierarchy level associated with the first issue type to the second hierarchy level; and
  in response to receiving the request to change the first hierarchy level associated with the first issue type to the second hierarchy level:
    access, from a data store, a hierarchy-issue type association data record of the first issue type including an identifier of the first issue type and a current hierarchy level identifier corresponding to the first hierarchy level;
    create a first set of unique parent-child issue type pairs based on a current state of the plurality of hierarchy levels;
    create a new hierarchy-issue type association data record including the identifier of the first issue type and a new hierarchy level identifier corresponding to the second hierarchy level;
    associate the first issue type with the second hierarchy level by storing a new hierarchy/issue type association data record in the data store; and
    create a second set of unique parent-child issue type pairs based on a new state of the plurality of hierarchy levels, the new state of the plurality of hierarchy levels based on the request to change the hierarchy level being serviced;
    determine whether a particular parent-child issue type pair in the first set of parent-child issue type pairs are absent in the second set of parent-child issue type pairs; and
    in response to determining that the particular parent-child issue type pair in the first set of parent-child issue type pairs are absent in the second set parent-child issue type pairs, determine that one or more issue relationships will be affected by changing the hierarchy level of the first issue type from the first hierarchy level to the second hierarchy level.

12. The non-transitory computer readable storage media of claim 11, wherein:
  the data store stores a plurality of issues, wherein each issue is associated with an issue type, one or more issues of the plurality of issues are related to one or more other issues of the plurality of issues according to a parent-child relationship, and the parent-child relationship information is stored in the data store; and
  upon determining that the particular parent-child issue type pair in the first set of parent-child issue type pairs are absent in the second set of parent-child issue type pairs, the non-transitory computer-readable storage media further comprising instructions which, when executed by the processing unit, cause the processing unit to identify, in the data store, parent issues of the parent issue type of the particular parent-child issue type pair and identifying one or more child issues of a child issue type of the particular parent-child issue type pair that are related to the parent issues based on the relationship information.

13. The non-transitory computer readable storage media of claim 12, further comprising instructions which, when executed by the processing unit, cause the processing unit to:
  generate impact information including identifiers of the parent issues and the child issues; and
  communicate the impact information to the user device for displaying on a display of the user device.

14. The non-transitory computer-readable storage media of claim 12, further comprising instructions which, when executed by the processing unit, cause the processing unit to break relationships between the parent issues and the child issues, wherein breaking the relationships between the parent issues and the child issues includes updating the relationship information of the parent and child issues in the data store.

* * * * *